(12) United States Patent
Ronacher et al.

(10) Patent No.: US 8,845,160 B2
(45) Date of Patent: Sep. 30, 2014

(54) LIGHTING MODULE FOR AN EMERGENCY SERVICE VEHICLE

(75) Inventors: Alexander Ronacher, Hoersching (AT); Bernhard Stadler, Neustift im Muehlkreis (AT)

(73) Assignee: Rosenbauer International Aktiengesellschaft, Leonding (AT)

( * ) Notice: Subject to any disclaimer, the term of this patent is extended or adjusted under 35 U.S.C. 154(b) by 210 days.

(21) Appl. No.: 13/517,270

(22) PCT Filed: Dec. 20, 2010

(86) PCT No.: PCT/AT2010/000489
§ 371 (c)(1),
(2), (4) Date: Aug. 14, 2012

(87) PCT Pub. No.: WO2011/075756
PCT Pub. Date: Jun. 30, 2011

(65) Prior Publication Data
US 2012/0320616 A1    Dec. 20, 2012

(30) Foreign Application Priority Data
Dec. 21, 2009 (AT) .............................. A 2016/2009

(51) Int. Cl.
*B60Q 3/04* (2006.01)
*B60Q 1/26* (2006.01)

(52) U.S. Cl.
CPC ............ *B60Q 1/2611* (2013.01); *B60Q 1/2696* (2013.01)
USPC ......................................... 362/543; 362/516

(58) Field of Classification Search
CPC .......... B60Q 1/52; B60Q 1/0041; B60Q 1/26; B60Q 1/2607; B60Q 1/2611; B60Q 1/2615; B60Q 1/28; B60Q 1/30; B60Q 1/32; F21S 10/06; F21S 10/066; F21S 48/211; F21S 48/215

USPC ................................................... 362/516, 543
See application file for complete search history.

(56) References Cited

U.S. PATENT DOCUMENTS 5,782,549 A    7/1998  Glatzmeier et al.
5,785,372 A    7/1998  Glatzmeier et al.

(Continued)

FOREIGN PATENT DOCUMENTS

CN    2585025 Y    11/2003
CN    2790512 Y    6/2006

(Continued)

OTHER PUBLICATIONS

International Search Report of PCT/AT2010/000489, Mar. 22, 2011.

(Continued)

*Primary Examiner* — Andrew Coughlin
(74) *Attorney, Agent, or Firm* — Collard & Roe, P.C.

(57) ABSTRACT

The invention relates to a lighting module (1) for an emergency service vehicle (24), comprising a profiled part (18), a first (3) and a second (5) lighting module, wherein the first lighting module (3) is arranged in a first accommodating area (2) of the profiled part (18) and illuminates a first spatial section (11). The second lighting module (5) is arranged in a second accommodating area (4) of the profiled part (18) and illuminates a second spatial section (12). The first lighting module (3) comprises a first lighting element (6) for emitting electromagnetic radiation and a transparent covering element (7), wherein furthermore the first lighting element (6) is formed by a semiconductor component and is arranged on a support structure (9). Furthermore, the second lighting module (5) comprises a second lighting element (8) made of a semiconductor component for emitting electromagnetic radiation.

11 Claims, 3 Drawing Sheets

(56) References Cited

U.S. PATENT DOCUMENTS

| | | |
|---|---|---|
| 6,114,954 A | 9/2000 | Palett et al. |
| 7,241,019 B1 | 7/2007 | Tsai et al. |
| 8,456,292 B2 | 6/2013 | Fukasawa et al. |
| 2003/0053317 A1 | 3/2003 | Mertens |
| 2003/0169160 A1 | 9/2003 | Rodriguez Barros et al. |
| 2004/0032745 A1 | 2/2004 | Pederson |
| 2007/0197084 A1 | 8/2007 | Darolfi et al. |
| 2008/0273345 A1 | 11/2008 | Yajima et al. |
| 2009/0290370 A1 | 11/2009 | Koizumi |
| 2010/0019689 A1* | 1/2010 | Shan .................. 315/294 |
| 2010/0253500 A1 | 10/2010 | Fukasawa et al. |

FOREIGN PATENT DOCUMENTS

| | | |
|---|---|---|
| DE | 41 23 136 | 1/1993 |
| DE | 200 11 341 U1 | 10/2000 |
| DE | 20 2006 010 974 | 9/2006 |
| EP | 0 755 285 | 1/1997 |
| EP | 1 293 380 A2 | 3/2003 |
| EP | 1 304 260 | 4/2003 |
| EP | 1 609 508 | 12/2005 |
| EP | 2 127 947 | 12/2009 |
| JP | 2006290186 A | 10/2006 |
| WO | WO 95/32875 | 12/1995 |
| WO | 2009050845 A1 | 4/2009 |

OTHER PUBLICATIONS

EN 1846-2, Firefighting and rescue service vehicles, Part 2: Common requirements—Safety and performance, Austrian Standards Institute, Oct. 15, 2009, total pp. 60. (Spec, p. 8).

International Preliminary Report on Patentability in PCT/AT2010/000489, Jul. 30, 2012.

* cited by examiner

LIGHTING MODULE FOR AN EMERGENCY SERVICE VEHICLE

CROSS REFERENCE TO RELATED APPLICATIONS

This application is the National Stage of PCT/AT2010/000489 filed on Dec. 20, 2010, which claims priority under 35 U.S.C. §119 of Austrian Application No. A 2016/2009 filed on Dec. 21, 2009, the disclosure of which is incorporated by reference. The international application under PCT article 21(2) was not published in English.

The invention relates to a lighting module for emergency service vehicles.

For emergency service vehicles, for example vehicles for firefighting and technical emergency missions or vehicles for medical services and patient transfer it is important that the surrounding at the place of action of the vehicle is well illuminated in order to ensure a safe acting of the personnel. Since aid missions have to be carried out in the darkness or at places having unknown complex topography, the risk of injury due to hardly or unidentifiable obstacles is essentially reduced by adequate illumination. It is furthermore important that such an ambient lighting having a sufficient brightness is available directly when the place of action has been reached, in particular without requiring a member of the emergency team leaving the emergency service vehicle for switching on the lighting system.

Since the emergency service vehicles mostly have a sufficient height, an ambient lighting of this kind is mostly attached in the region of the roof, because a large section around the emergency service vehicle can thus be illuminated. In order to obtain a most homogeneous possible illumination, the arrangement of a light source in the area of the roof edge of the emergency service vehicle is disclosed in document EP 0 755 285 B1. A fluorescent tube is used as an illuminant.

Also document DE 20 2006 010 974 U1 discloses an emergency service vehicle, the roof construction of which is, in particular in the region of a roller-shutter box, equipped with a fluorescent lamp.

The EP 1 609 508 B1 discloses an emergency service vehicle, which has several single lamps arranged in the region of its roof.

Document DE 41 23 136 A1 discloses an ambient lighting of an emergency service vehicle, which has a fluorescent tube arranged in the region of the roller-shutter box and which is covered by the lowered roller-shutters. In order to illuminate the surrounding of the emergency service vehicle, the roller-shutter needs to be lifted in this case.

In order to obtain a corresponding illumination of the area to be illuminated, single lamps have the disadvantage that the single lamps need to emit a correspondingly high amount of light, which results in the risk that the emergency personnel can be dazzled. Single lamps, in particular if disposed on the roof, further have the disadvantage that they tower over the emergency service vehicle, thus resulting in an increased risk of damage. Fluorescent lamps have the disadvantage that the light emitted shortly after the lamp has been switched on is very low and only after a corresponding time of operation and the thereto connected heating of the lamp, the desired level is obtained. This is of particular disadvantage in the event of actions at low outside temperatures. Furthermore, fluorescent lamps have a component-related volume which needs to be accommodated in the vehicle together with the required control circuit. Thermal emitters, gas discharge lamps and arc lamps have furthermore the disadvantage of being sensitive to vibrations and strokes due to the construction and operating principle. Therefore, it can probably be necessary to provide complex absorber solutions in order to omit mechanical stress at the illuminant as it can occur when the emergency service vehicle is in operation. For example, when a combustion engine is operated on-load, for operating a high-pressure water pump of a fire engine, strong vibrations result, which directly effect the illuminants and result in an increased wear. The result is a reduced effective operating time of the illuminants and the particular danger of a failure of the illuminant during operation.

Since mostly also an illumination of the roof region of the emergency service vehicle is of advantage, for example when additional operating resources are disposed there, prior art discloses that a part of the light emitted by the illuminant is deflected to the roof region. This is however disadvantageous because the main radiation power of the illuminant should be deflected to the surrounding, because the roof region only requires a low illumination and the area to be illuminated is smaller, too. The deflection is on the one hand difficult to perform and it furthermore causes that a part of the light emitted by the illuminant cannot be used for ambient lighting.

The underlying objective of the invention is therefore to provide a complex lighting system which illuminates the surrounding of an emergency service vehicle and the roof region of an emergency service vehicle without dazzling and in particular the illumination in the region to be illuminated is independent of the operating time and the ambient temperature.

The objective of the invention is achieved by the existence of a first and a second lighting module, with the first lighting module illuminating a first spatial section, in particular the surrounding of the emergency service vehicle, and the second lighting module illuminating a second spatial section, in particular the roof region of the emergency service vehicle. The first lighting module is disposed in a first accommodating area of the profiled part and has a first lighting element formed by a semiconductor component and a transparent covering element, with the first lighting element furthermore being arranged on a support structure. The second lighting module is disposed in a second accommodating area of the profiled part and has furthermore a second lighting element formed by a semiconductor component.

The arrangement of the lighting modules in a first and second accommodating area has the advantage that each of the accommodating areas can optimally be arranged with respect to the section to be illuminated. The lighting module according to the invention is preferably attached to the vehicle as high as possible and with respect to the width of the vehicle as far to the outside as possible in order to ensure on the one hand the best possible initial position for the ambient lighting and on the other hand the least possible restriction of the useful roof area. The lighting module according to the invention particularly allows an adjustment of the radiation power for illuminating the first and the second spatial section as individually as possible without requiring to deflect the radiation power of the one and only light source accordingly, as it is shown in prior art, where always a part of the emitted radiation power gets lost due to the required compromise solution with respect to the arrangement of the illuminant.

The semiconductor component of the first and/or second lighting element is preferably formed by a light-emitting diode (LED) and both the organic and also the inorganic light-emitting diodes can be used. Light-emitting diodes have the particular advantage that the can be embodied very compactly and can therefore provide a very high light output at small volumes. In particular the efficiency is considerably larger compared to thermal radiation sources, such as for example halogen bulbs. Furthermore, the effort of driving in terms of circuitry is considerably reduced compared to gas discharge lamps or arc lamps. If necessary, the driving circuit can be integrated into the semiconductor component. Of particular advantage is however that LEDs develop their complete brightness directly after having been switched on and the radiation power emitted does essentially not depend on the ambient temperature. Another advantage resides in the fact that the light-emitting diodes generally are a point-like source of light, which is of special advantage in terms of achieving a corresponding illumination profile of the ambient illumination.

Semiconductor components have furthermore the advantage that they can also emit electromagnetic radiation in the invisible range, for example in the UV range, with the result that fluorescing safety reflectors at the clothing of the emergency personnel are excited to glow and thus a considerable improvement of the visibility is provided. Using the semiconductor components, also the wavelength of the emitted electromagnetic radiation can be adjusted in wide ranges, with the result that depending on the occasion, such as for example in the event of extreme smoke or heavy fog, a color of light is emitted that can be seen better by the human eye and nevertheless sufficient illumination is provided. Another advantage of semiconductor components is that the electromagnetic radiation emitted can such be chosen as to allow for the emergency personnel a correct color perception, which can only be achieved with considerable additional effort when using gas discharge lamps or arc lamps. Correct color perception can be of particular importance in the particular case that signs with respect to dangerous goods, safety reflectors or colored marks of lines should be recognized. Those are mostly marked using a signal color, and the signal effect of the color can probably get lost in the light of a gas discharge lamp.

A further embodiment according to which the first lighting module has at least two first lighting elements has the advantage that the radiation power of the lighting module which is required to obtain a corresponding illumination in the first spatial section can be carried out by two lighting elements, with an embodiment comprising three lighting elements being preferred so that each of the first lighting elements has a lower single brightness, which is of particular advantage in terms of reducing the dazzling effect. Due to the compact embodiment and the essentially point-like light source a particularly good and homogenous illumination of the first spatial section is possible by positioning the lighting elements individually, because the light deflecting elements can be optimized particularly well for point-like light sources.

In order to achieve the most even possible illumination of the first spatial section, a further embodiment is of advantage, according to which the maxima of the electromagnetic radiation emitted by the first lighting elements do not run parallel to one another, in other words, the main beam direction of the individual, first lighting elements include an angle towards one another. Due to appropriate embodiment of the support structure, the individual, first lighting elements can be targeted so that each individual, first lighting element illuminates a section of the first spatial section, which angle is preferably within a range of 5 to 25° and according to a further embodiment using three first lighting elements, the angle between the beam directions near the profiled part and beam directions distant from the profiled part decreases.

In order to achieve the best possible illumination of the spatial section it is of advantage if the respective lighting module is disposed as high as possible above the section to be illuminated. This is already provided for the first spatial section and the first lighting module due to the construction height of the vehicle. For the second lighting module which illuminates the roof section as the second spatial section it is therefore of advantage if the second lighting module is disposed in an upper edge section of the profiled part, because thus, a good illumination of the second spatial section is ensured without elaborate light guidance.

Each first lighting element emits electromagnetic radiation into a spatial section, with the maximum being emitted in a main beam direction. The further an emitted light beam deviates from the main beam direction, the higher is the risk of losing this light beam in terms of illuminating the first spatial section. It is therefore of advantage if at least sections of the support structure are embodied in a reflecting way, because thus light beams deviating from the main beam direction can be deflected specifically and result in a contribution with respect to the direction of the main beam direction. With a preferred embodiment of the semiconductor components the angle of aperture of the essentially symmetrical cone of radiation of the emitted electromagnetic radiation is 120°. This angle of radiation is nevertheless only to be understood exemplary, in further embodiments the radiation characteristic of a lighting element can also be embodied hemispherical, for example, but radiation characteristics being more directed and having a smaller angle of aperture are possible as well.

It is furthermore of advantage if the covering element is embodied to be a light-directing element because thus the light beams of the first lighting elements, essentially not being emitted in the direction of the main beam direction, can be deflected in the direction of the main beam direction, thus contributing to an increase of the density of illumination in the first spatial section, thus increasing the light-related efficiency of the lighting module. In order to deflect an incoming light beam in a second direction different from the input direction, the covering element can for example be formed as a prism disk. The lighting element can for example have a microstructuring causing such a guidance of light. This embodiment has furthermore the advantage that the light directing element also functions as a kind of diffusor thus reducing the dazzling effect.

With an emergency service vehicle it is of importance that the closer surrounding of the vehicle is illuminated without dazzling the emergency personnel. Since the lighting module according to the invention is preferably disposed in the area of the roof of the emergency service vehicle the corresponding arrangement of the first lighting module causes that the first spatial section is illuminated in such a way that, with respect to a horizontal towards the profiled part or the emergency service vehicle, the main beam near the profiled part intersects the horizontal at an angle between 50° and 65° and the main beam distant from the profiled part intersects the horizontal at an angle between 10° and 30°. If the vehicle is for example 3 m high, the main beam near the profiled part hits the base area at a distance of approximately 2 m and the main beam distant from the profiled part at a distance of 6 m, in each case relative to the normal with respect to the lighting module.

Since the lighting module according to the invention is disposed outside of the emergency service vehicle thus being exposed to the effect of weather and in particular stress due to the mission performances carried out with the emergency service vehicle, it is of advantage if the covering element can be exchanged quickly and easily. According to a further embodiment, the covering element is therefore connected to the profiled part by means of a clamping connection and further a clamping means, with the result that particularly an easy exchange of the covering element is ensured. Furthermore, the clamping connection and the clamping means can provide a sealing element or can be formed as a sealing element with the result that is possible for the covering element to be also embodied in a liquid-tight way.

A further embodiment according to which the first and/or the second lighting element is embodied to be strip-shaped has the advantage that it is on the one hand particularly easy for the lighting element to be disposed at or in the lighting module so that in this way the radiation intensity can be kept sufficiently low in each section, causing that a dazzling effect is avoided, nevertheless, generally a sufficiently high radiation intensity is emitted in order to achieve an appropriate illumination in the first and second spatial section. A lighting element of this kind can for example be formed from chained light-emitting diodes, in particular in the form of a strip LED array, it is nevertheless possible to be embodied as a electroluminescence component, too.

Of further advantage is an embodiment according to which the profiles part in a lower section comprises a groove-shaped mounting device for a plate-shaped component. Since the lighting module according to the invention is preferably disposed at the transition point between the lateral wall and the roof region of an emergency service vehicle, it is of advantage if the attachment parts, e.g. a roof plate can be disposed directly at the lighting module without additional mounting devices, because thus a particular compact is allowed. The outer dimensions of an emergency service vehicle shall on the one hand comply with the road traffic regulations, on the other hand it is desired to accommodate as many devices as possible within the volume available. It is therefore of advantage if the individual components, in particular the lighting module according to the invention, are embodied in such a way that they can also perform connecting function and in particular carrying function. The roof plate is now for example being inserted into the mounting device and held in a corresponding position by a clamping lug. In particular, a sealing of the roof plate with respect to the equipment cab is thus achieved, too.

In this respect, also a further embodiment is of advantage, according to which the profiled part includes in its lower section a mounting section having at least one securing means, since thus the lighting module can be connected to the frame of the equipment cab consequently being able to perform a carrying and mounting function. In particular, the power affecting the roof plate can easily be transferred to the frame structure of the equipment cab.

A further embodiment according to which the profiled part is formed as an extruded hollow-chamber profile has the advantage that profiles of this kind can be produced quickly and in particular cost-effective. Due to the embodiment as a hollow-chamber profile particularly a high mechanic strength at similar low consumption of material and thus a low weight can be obtained, with furthermore supply lines being arranged within the hollow chambers, which lines are disposed protected against one another due to the existing separating walls between the chambers. In further embodiments, also bent sheet metal members are possible to be used, furthermore molded plastic components can be used as profiled part.

According to a further embodiment the profiled part has a mounting for a pivotable safety element. In particular cases it can occur that the emergency personnel stay on the roof, which can under certain conditions result in an endangering of the personnel. Due to a possible obstructed line of sight caused by smoke or due to the speed of the actions taking place there is the danger that a member of the team steps beyond the border of the roof and falls off the emergency service vehicle. A pivotable safety element can for example be a retractable railing which in its basic position is disposed in a mounting or in a profiled part, thus not having an essential negative effect on the construction height. In the event of an action, the safety element is folded out thus correspondingly bordering the roof area. The safety element can in particular be embodied in such a way that it complies with country-specific and international safety requirements for emergency service vehicles, for example the EN 1846-2 and the rules of the ICAO for emergency service vehicles in the airport sector.

In a further embodiment the profiled part can furthermore have a mounting device for a covering element, with the result that different attachment parts can be attached to the profiled part. In individual cases, for example, design and function elements can be disposed, such as information boards or warning signs. Also an optional superelevation of the roof region can be possible in order to allow for more devices to be stacked on the roof. It is also possible for the covering element to be embodied as a privacy shield in order to seal off the roof region against the surrounding.

For a better understanding, the invention will be explained in more detail below according to the figures shown in the drawings.

The heavily simplified schematics show.

Firstly, it should be pointed out that the same parts described in the different embodiments are denoted by the same reference numbers and the same component names and the disclosures made throughout the description can be transposed in terms of meaning to same parts bearing the same reference numbers or same component names. Furthermore, the positions chosen for the purposes of the description, such as top, bottom, side, etc, relate to the drawing specifically being described and can be transposed in terms of meaning to a new position when another position is being described. Individual features or combinations of features from the different embodiments illustrated and described may be construed as independent inventive solutions or solutions proposed by the invention in their own right.

All value range specifications in the objective description should be taken as arbitrary ranges which encompass all subareas lying within these ranges, e.g. the specification 1 to 10 should be understood to encompass the full range starting from the bottom limit 1 and rising to the top limit 10, i.e. all subareas start with a bottom limit of 1 or more and end with a top limit of 10 or less, e.g. 1 to 1.7, or 3.2 to 8.1, or 5.5 to 10.

Figure 1:
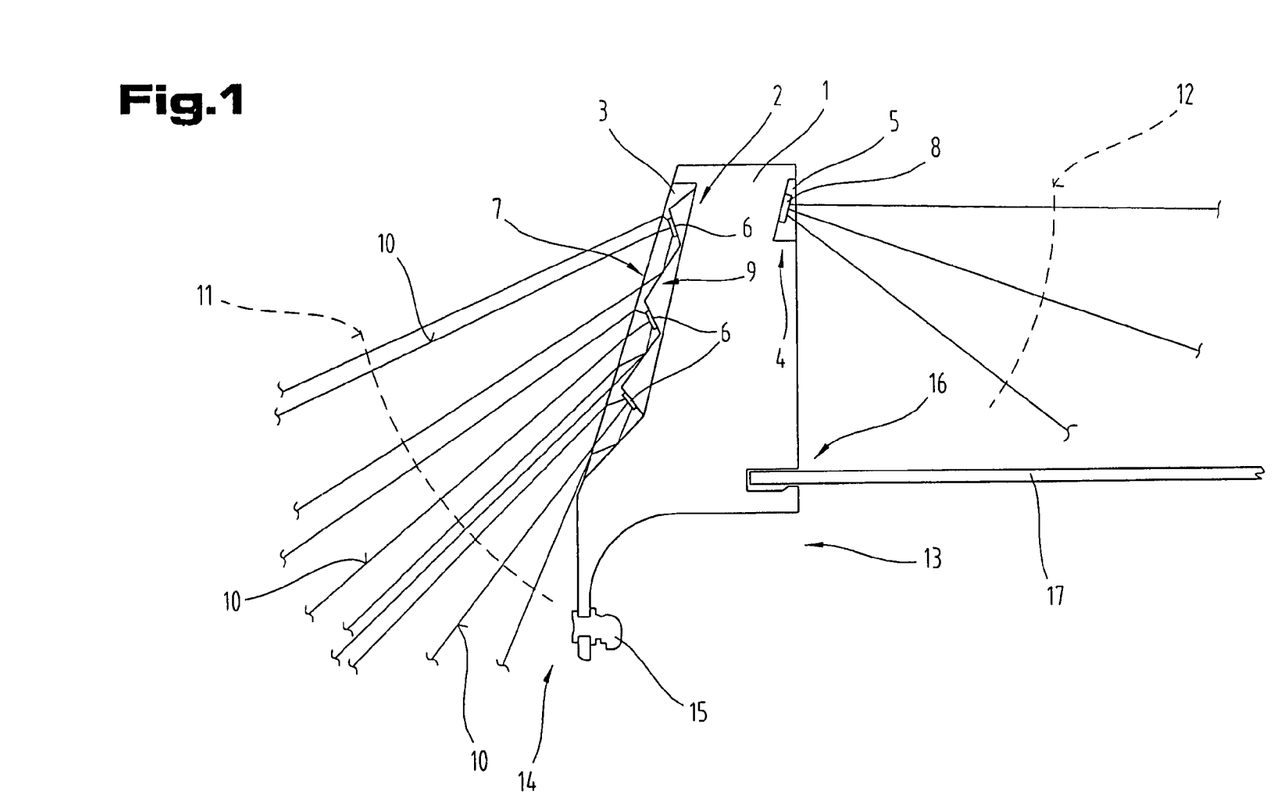
FIG. 1 a simplified schematic diagram of the lighting module according to the invention.

FIG. 1 shows a simplified illustration of the lighting module 1 according to the invention, with a first lighting module 3 being disposed within a first accommodating area 2 and a second lighting module 5 being disposed within a second accommodating area 4. The first lighting module has furthermore first lighting elements 6 formed by a semiconductor component, furthermore, a covering element 7 is present, sealing the first lighting module 3 off against the surrounding. The first lighting module 3 has furthermore a support structure 9, where the first lighting elements 6 are arranged on, with the main beam directions 10 of the individual first lighting elements 6 not being arranged parallel due to first lighting elements 6 being displaced offset to each other and particularly being differently shifted relative to each other, with the result that the first lighting module 3 illuminates a first spatial section 11. The second lighting module 5 comprises a second lighting element 8 formed by a semiconductor component. Since the lighting module 1 according to the invention is preferably disposed in the roof region of an emergency service vehicle, the first spatial section 11 corresponds to the closer surrounding around the outside of the emergency service vehicle. Since equipment can also be disposed at the roof of an emergency service vehicle or the roof can be embodied to be accessible, the second lighting module 5 illuminates a second spatial section 12, which preferably corresponds to a part of the roof region of the emergency service vehicle.

The advantage of the lighting module 1 according to the invention resides in the fact that both lighting modules can be optimized for the respective purposes, in particular the first lighting elements 6 of the first lighting module, in conjunction with the embodiment of the support structure 9, allow an appropriately good illumination of the surrounding region without dazzling the emergency personnel by a too strong single brightness of the first lighting elements or the first lighting module. At the same time, an illuminating of the roof region is possible, without requiring for the radiation of the first lighting module to be deflected thus not being available for illuminating the first spatial section. Due to the smaller area to be illuminated in the roof region, furthermore a lower radiation power of the second lighting module is required, and it is an advantage that the first 3 and the second 5 lighting module can be designed independently of each other and optimized with respect to the respective individual case. It is in particular of advantage, however, that the embodiment according to the invention of the first 6 and the second 8 lighting elements as semiconductor elements allows a very high light output at s similar very small volume of the component and furthermore the emitted light output contrary to for example known fluorescent tubes does not depend on the ambient temperature and the operating time so that the complete brightness is available directly after switching on. Contrary to thermic radiation, for example halogen bulbs, gas discharge lamps or arc lamps, a semiconductor component is not shock-sensitive. From an energetic point of view, semiconductor components have the further particular advantage that the power input for achieving a comparable light output is considerably lower than it is the case with known illuminants and thus, a considerably better efficiency is achieved. With a mobile emergency service vehicle, the electrical energy for operating the lighting module needs to be generated on site, mostly by the combustion engine of the vehicle or an additional generator. Since the electrical energy available is limited, lighting elements having a higher efficiency always have important advantages.

The profiled part of the lighting module 1 is preferably structured in such a way that the entire lighting module 1 can also perform load-bearing tasks and can thus form a structural component of the equipment cab of the emergency service vehicle. For this purpose, preferably in the lower section 13 a mounting section 14 is provided, which connects the profiled part 18 to a structural component of the frame via a securing means, thus forming a part of the exterior chassis. In order to seal against the surrounding the profiled part with the shutter disposed in this region and moved by means of a guide rail, also a sealing element 13 can be included in this section 13. Also in the lower section 13, a mounting device 16 is provided, which is preferably embodied to be groove-shaped and has a clamping lug, and a roof plate 17 is disposed within the mounting device 16, with the result that devices for construction and mounting can be omitted again, since the roof plate can be accommodated and held directly by the lighting module 1, in particular by the profiled part 18.

Figure 2:
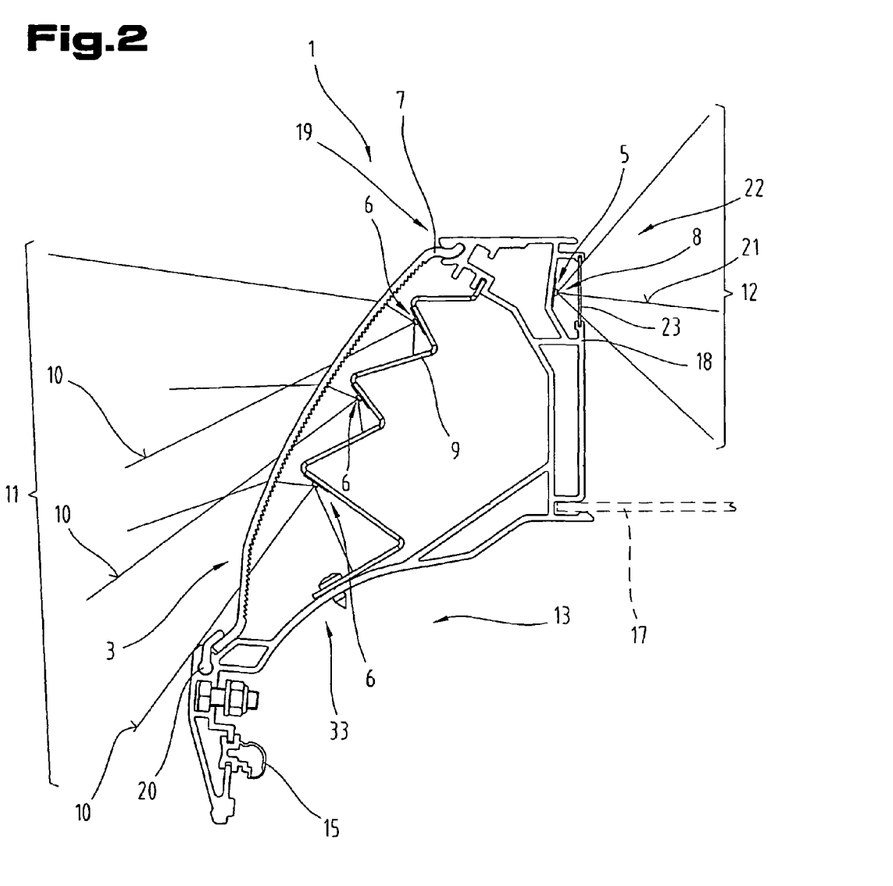
FIG. 2 a preferred embodiment of the lighting module according to the invention.

FIG. 2 shows a cross section through a preferred embodiment of the lighting module 1 according to the invention. The structuring of the profiled part 18 can be seen clearly, with the creation of the individual chambers or stiffening- and strutting bars creating a compact, self-supporting and torsion-resistant component which offers at low weight and compact dimensions sufficient stability to form a functional component of the equipment cab of the emergency service vehicle.

The support structure 9 for holding the first lighting element 6 is preferably formed to be meandering, which has the advantage that using the lighting characteristics of the individual first lighting elements 6 indicated in the Figure, a positive overlapping of the parts of the electromagnetic radiation emitted by the individual first light elements 6 are provided for illuminating the first spatial section 11. Since each first lighting element 6 does not only emit the generated electromagnetic radiation in the main beam direction 10 but for example in the form of a cone having an angle of aperture of 120°, the distribution of the emitted electromagnetic radiation can by means of a support structure 9 having at least reflecting sections be influenced so that the electromagnetic radiation which is not emitted in the desired preferential direction is deflected in the direction of the main beam direction by means of the reflecting sections of the support structure 9, which results in an increased efficiency and an increased density of illumination in particular within the first spatial section 11.

In this respect, a further embodiment is of advantage, according to which the covering element 7 is embodied as a light directing element, thus deflecting those light beams not hitting the covering element 7 in the direction of the main beam direction in the main beam direction. For example, the covering element 7 can be formed as an array of microprisms, a light direction of this kind is nevertheless also possible by using a structuring, for example be means of a saw tooth thread design. The covering element 7 particularly allows for as much as possible named stray-light to be directed in the direction of the first spatial section 11, thus increasing the entire efficiency of the lighting module 1 because less generated electromagnetic light output gets lost and a higher light output is achieved. It is further of advantage that a covering element of this kind reduced or avoids the dazzling effect for the emergency personnel, because the essentially point-like source of light of a semiconductor component and the thereto connected high brightness of this point of light is widened to a larger area.

Due to the prevailing conditions during an action, in particular with fire engines, it can occur that the covering element 7 gets damaged or is affected in terms of its transparency. It is thus of advantage if it can be replaced easily and quickly without endangering the liquid-tight sealing of the first lighting module 3. For this purpose, the covering element 7 is connected to the profiled part 18 by means of a clamping connection 19 and a clamping means 20. The first lighting module 3 includes particularly the support structure 9, the thereon disposed first lighting elements 6 as well as the covering element 7.

It results from the arrangement of the first lighting elements 6 on the support structure 9 that the main beam direction 10 of the individual first lighting elements 6 illuminates another section of the first spatial section 11 in each case. The main beam directions 10 thus do not extend parallel to one another.

Since also the second lighting element 8 of the second lighting module 5 is formed by a semiconductor element which preferably emits its electromagnetic radiation in a main beam direction 21, in cooperation with the arrangement of the second lighting module 5 an even and reliable illumination of the second spatial section is achieved in an upper section 22 of the profiled part 18. Since the area to be illuminated by the second lighting module 5 is considerably smaller compared to the first spatial section and mostly also a lower illumination value is required, the second lighting module mostly only has a single, second lighting element 8. This second lighting element 8 is arranged at a bar of the profiled part 18, which bar being tilted towards the profiled bar with respect to a vertical, so that the main beam direction 21 of the second lighting module 5 is tilted slightly downwards with respect to a horizontal, so that the predominant part of the electromagnetic radiation emitted by the second lighting module 5 is directed downwards to the roof plate 17. In order to protect the semiconductor component, the second lighting module 5 has a transparent covering plate 23 which can also be embodied as a light-directing element.

With an emergency service vehicle, the space available should be used as optimal as possible. Thus, the access to the equipment is preferably performed via the lateral walls. For this purpose, the equipment compartments are mostly covered by roller-shutters, with the wind-up mechanism for the roller-shutters mostly being disposed in the roof region. The lighting module 1 according to the invention is preferably disposed at the upper outer region of the equipment cab, in particular at the transition region between roof and lateral wall, and in this region mostly also devices for operating or winding-up the roller-shutters are arranged, which roller-shutter preferably covers the equipment compartments accessible from the lateral surfaces. According to a further embodiment, the profiled part 18 thus has in its lower section 13 an inwardly curved recess 33, with the result that the wind-up mechanism or the guide rail of the roller-shutter can adapt to this recess, thus providing more space for the equipment compartments disposed within the frame structure. Said recess 33 can e.g. be embodied to be essentially circular. For this purpose, an extruded profiled part 18 is of advantage, since structural features of this kind can easily be embodied with extruded molded parts. The profiled part 18 can for example be formed from a non-ferrous material, such as aluminum, it is nevertheless possible to be embodied from a fiber composite, but in this case, components may be necessary, to allow an appropriate arrangement of the first and the second lighting module.

In order to simplify the illustration, FIG. 2 only shows the essential edge and main beams. The reflected beams or beams having been directed by the covering element are not shown.

Figure 3:
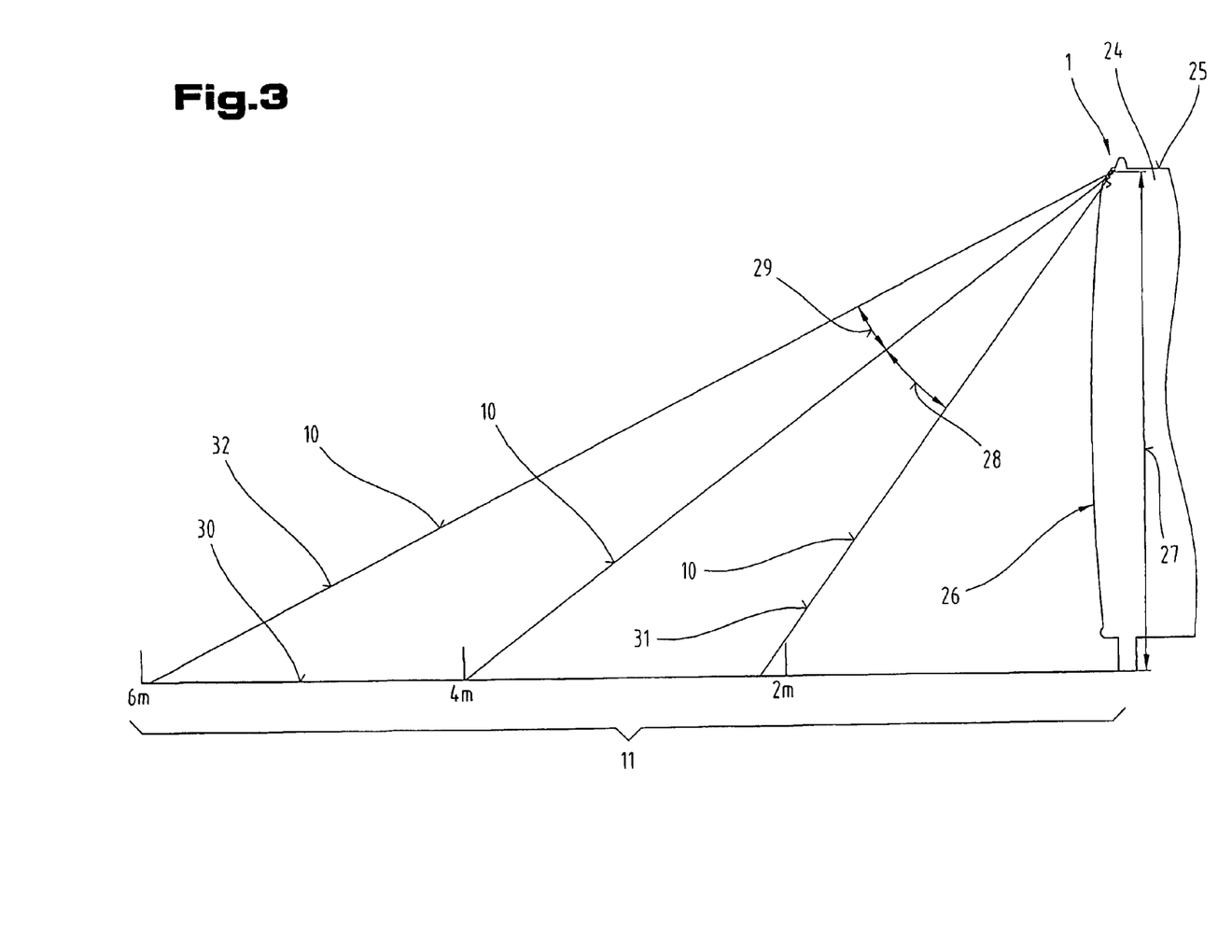
FIG. 3 an illustration of the light conditions of an emergency service vehicle having a lighting module according to the invention.

FIG. 3 shows a schematic illustration of the light conditions in the first spatial section 11, the surrounding of the emergency service vehicle 24, with the lighting module 1 according to the invention being disposed in the edge region between roof 25 and lateral wall 26. In compliance with the road traffic regulations, the emergency service vehicle 24 will have a certain maximum construction height 27, with the conditions illustrated in FIG. 3 being valid for a vehicle height of about 3 m. In order to simplify the beam paths, FIG. 3 only shows the main beams 10 of the individual, first lighting elements of the first lighting module. Due to the elevated arrangement of the lighting module 1 it is possible for a large region around the emergency service vehicle 24, i.e. a large, first spatial section 11 to be illuminated, similarly reducing the dazzling effect for the emergency personnel.

Since the first lighting elements are arranged on the frame structure of the first lighting module, a non-linear widening of the light beam emitted by the lighting module into the first spatial section is achieved. In particular the main beams 10 do not run parallel to one another, with the result that the angle between the main beams of the main beam near the vehicle towards the main beam distant from the vehicle decreases. In the illustrated case including three first lighting means in the first lighting module, the first angle 28 between the main beam near the vehicle and the central beam is about 17°, the second angle 29 between the central beam and the main beam distant from the vehicle is about 10°. These angle specifications are reference values for a preferred embodiment, the actual widening angle of further embodiments may differ from these specifications. With this embodiment, the main beam near the vehicle hits the base area 30 at a horizontal distance to the emergency service vehicle 24 of about 2 m and an angle of ca. 54°. The center beam hits the base area at a horizontal distance of ca. 4 m and at an angle of ca. 37° and the main beam distant from the vehicle hits the base area at a horizontal distance of up to 6 m and an angle of ca. 27°. Thus, an area of up to 6 m horizontal distance from the esc can be illuminated, but this distance only refers to the main beams. Due to the beam directing covering element, this region will be larger, however, as the horizontal distance increases, the illumination will decrease. Due to a corresponding embodiment of the support structure of the first lighting module, several first light elements can probably be existent, with the result that e.g. the illumination of the first spatial section 11 can be increased and furthermore also a homogenous illumination is allowed.

The ratios and values given in FIG. 3 are considered to be an example of a possible embodiment. By corresponding embodiment of the support structure and the embodiment of the first lighting elements, the first spatial section to be illuminated can vary in wide regions with a predefined vehicle height. Particularly the values given will directly depend on the vehicle height.

The advantage of the lighting module according to the invention in particular resides in the fact that the use of semiconductor components, in particular light-emitting diodes, to the greatest possible extent point-shaped light sources having a high brightness are used as first and second lighting elements which can thus easily be directed for illuminating the first and second spatial section, therefore allowing a very good illumination. Of special advantage is particularly that the semiconductor components have a high efficiency and emit the maximum brightness directly after having been switched on and the brightness does furthermore not depend on the ambient temperature as it is for example the case with known fluorescent tubes. In addition, the semiconductor components have a considerably lower component height, so that the lighting module can be embodied noticeably more compact, this being important in order to exploit the space available with emergency service vehicles as optimally as possible. Due to the arrangement of two lighting modules, both spatial sections can be illuminated in an optimally adjusted way, in particular no compromises with respect to the illumination of both spatial sections need to be accepted contrary to an illuminant with a consequently required light deviation. Furthermore it is possible to adjust the color of the light using semiconductor components, with the result that it can be adjusted to the operation conditions.

The example embodiments show possible design variants for lighting module and it is noted at this point that the invention is not restricted exclusively to the design variants specifically described, but instead facilitates diverse consolidated combinations of the individual design variants, and that the possibilities of variation depend, due to the technical teaching protected by patent, on the ability of the person skilled in the art in this technical area. All conceivable design variants that are possible through the combination of the individual details of the presented and described configuration variants are thus also protected by the scope of the patent.

For the sake of good order, finally, it should be pointed out that, in order to provide a clearer understanding of the structure of the support, it and its constituent parts are illustrated to a certain extent out of scale and/or on an enlarged scale and/or on a reduced scale.

The fundamental function of the independent inventive solutions can be taken from the description.

Particularly, the individual features illustrated in the embodiments shown in the FIGS. 1 to 3 may be construed as independent solutions proposed by the invention in their own right. The associated objectives and solutions proposed by the invention may be found in the detailed descriptions of the drawings.

LIST OF REFERENCE NUMERALS

1 Lighting module
2 First accommodating area
3 First lighting module
4 Second accommodating area
5 Second lighting module
6 First lighting element
7 Covering element
8 Second lighting element
9 Support structure
10 Main beam direction
11 First spatial section
12 Second spatial section
13 Lower section
14 Mounting section
15 Sealing element
16 Mounting device
17 Plate-shaped component, roof plate
18 Profiled part
19 Clamping connection
20 Clamping means
21 Main beam direction
22 Upper section
23 Transparent covering plate
24 Emergency service vehicle
25 Roof
26 Lateral wall
27 Construction height/Work height
28 First angle
29 Second angle
30 Base area, horizontal
31 Main beam near the profiled part
32 Main beam distant from the profiled part
33 Indentation, recess

The invention claimed is:

1. Emergency service vehicle having a lighting module, which lighting module is arranged outside and in the region of the roof edge of the emergency service vehicle, with the emergency service vehicle being embodied as a fire engine, with the lighting module comprising a profiled part, a first lighting module, and a second lighting module, with the first lighting module being arranged in a first accommodating area of the profiled part and illuminating a surrounding near the emergency service vehicle as a first spatial section extending in a first direction, with the second lighting module being arranged in a second accommodating area of the profiled part and illuminating a roof section of the emergency service vehicle as a second spatial section extending in a second direction opposite to said first direction, wherein the first lighting module comprises at least two first lighting elements for emitting electromagnetic radiation and a transparent covering element, with each first lighting element being formed by a semiconductor component and being arranged on a support structure, wherein each first lighting element emits the maximum of the electromagnetic radiation in a main beam direction with the main beam directions limiting an angle towards one another, with the result that each first lighting element illuminates a section of the first spatial section, wherein each of the at least two first lighting elements is disposed at a first cross-section, the first cross-section running transversely through a longitudinal direction of the profiled part, wherein the second lighting module comprises a second lighting element made of a semiconductor component for emitting electromagnetic radiation, and wherein the second lighting module is disposed in an upper edge section of the profiled part.

2. Emergency service vehicle according to claim 1, wherein at least sections of the support structure are embodied to be reflective.

3. Emergency service vehicle according to claim 1, wherein the covering element is embodied as a light-directing element.

4. Emergency service vehicle according to claim 1, wherein with respect to a horizontal towards the profiled part, the main beam near the profiled part intersects the horizontal at an angle between 50° and 65° and the main beam distant from the profiled part intersects the horizontal at an angle between 10° and 30°.

5. Emergency service vehicle according to claim 1, wherein the covering element is connected to the profiled part via a clamping connection and furthermore a clamp.

6. Emergency service vehicle according to claim 1, wherein the first and/or the second lighting element is embodied to be strip-shaped.

7. Emergency service vehicle according to claim 1, wherein the profiled part in a lower section has a groove-shaped mounting device for a plate-shaped component.

8. Emergency service vehicle according to claim 1, wherein the profiled part in the lower section has a mounting section including at least one fastener.

9. Emergency service vehicle according to claim 1, wherein the profiled part is embodied as an extruded hollow-chamber profile.

10. Emergency service vehicle according to claim 1, wherein the profiled part has a mounting for a pivotable safety element.

11. Emergency service vehicle according to claim 1, wherein the profiled part includes a mounting device for a covering element.

* * * * *